United States Patent
Tang et al.

(10) Patent No.: US 11,141,652 B2
(45) Date of Patent: *Oct. 12, 2021

(54) DIAL ASSEMBLY, REMOTE CONTROL, AND METHOD FOR CONTROLLING AN UNMANNED AERIAL VEHICLE

(71) Applicant: SZ DJI TECHNOLOGY CO., LTD., Shenzhen (CN)

(72) Inventors: Yin Tang, Shenzhen (CN); Tao Zhao, Shenzhen (CN); Guozhu Gui, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 4 days.

This patent is subject to a terminal disclaimer.

(21) Appl. No.: 16/729,478

(22) Filed: Dec. 29, 2019

(65) Prior Publication Data

US 2020/0129852 A1 Apr. 30, 2020

Related U.S. Application Data

(63) Continuation of application No. 15/471,141, filed on Mar. 28, 2017, now Pat. No. 10,518,173, which is a (Continued)

(51) Int. Cl.
*A63F 13/24* (2014.01)
*A63F 13/20* (2014.01)
*A63F 13/245* (2014.01)
*A63F 13/218* (2014.01)
(Continued)

(52) U.S. Cl.
CPC .............. *A63F 13/24* (2014.09); *A63F 13/20* (2014.09); *A63F 13/218* (2014.09);
(Continued)

(58) Field of Classification Search
CPC ...... A63F 13/24; A63F 13/235; A63F 13/218; A63F 13/245; A63F 13/20; G03B 15/006;
(Continued)

(56) References Cited

U.S. PATENT DOCUMENTS 7,438,148 B1 * 10/2008 Crea .................... B62D 1/24
                                                    180/167
8,672,761 B2 * 3/2014 Kidakarn .............. A63F 13/218
                                                    463/37
(Continued)

FOREIGN PATENT DOCUMENTS

CN       1619742 A     5/2005
CN     102486662 A     6/2012
(Continued)

OTHER PUBLICATIONS

The World Intellectual Property Organization (WIPO) International Search Report for PCT/CN2014/088048 dated Apr. 27, 2015 6 Pages.

*Primary Examiner* — Dale W Hilgendorf
(74) *Attorney, Agent, or Firm* — Anova Law Group, PLLC

(57) ABSTRACT

A dial assembly comprises a dial base, a rolling wheel, a dial handle, a reset elastic member, and a sensor. The dial base includes a first rotation channel and a second rotation channel. The rolling wheel is seated on the first rotation channel and rotatable along the first rotation channel. The dial handle is rotatably connected with the dial base and rotatable along the second rotation channel. The dial handle is connected with the rolling wheel and configured to rotate along with the rolling wheel. The reset elastic member is connected with the dial handle and configured to provide a restoring force to the dial handle. The sensor is connected with the dial handle and configured to obtain a rotation angle of the rolling wheel by sensing a rotation of the dial handle and convert the rotation angle into a control signal to transmit.

20 Claims, 7 Drawing Sheets

Related U.S. Application Data continuation of application No. PCT/CN2014/088048, filed on Sep. 30, 2014.

(51) Int. Cl.
    *A63F 13/235*    (2014.01)
    *G03B 15/00*    (2021.01)
    *A63H 30/04*    (2006.01)
    *B64C 39/02*    (2006.01)
    *G05D 1/00*    (2006.01)
    *G03B 17/56*    (2021.01)
    *B64D 47/08*    (2006.01)

(52) U.S. Cl.
    CPC .......... *A63F 13/235* (2014.09); *A63F 13/245* (2014.09); *A63H 30/04* (2013.01); *B64C 39/024* (2013.01); *G03B 15/006* (2013.01); *G05D 1/0094* (2013.01); *B64C 2201/127* (2013.01); *B64D 47/08* (2013.01); *G03B 17/561* (2013.01)

(58) Field of Classification Search
    CPC .. G03B 17/561; G05D 1/0094; G05D 1/0016; B64C 39/024; B64C 2201/127; A63H 30/04; B64D 47/08
    See application file for complete search history.

(56) References Cited

U.S. PATENT DOCUMENTS

| | | | | |
|---|---|---|---|---|
| 8,903,568 | B1* | 12/2014 | Wang | G05D 1/0038 701/2 |
| 10,518,173 | B2* | 12/2019 | Tang | A63F 13/20 |
| 10,582,259 | B2* | 3/2020 | Enke | H04N 5/23229 |
| 10,635,097 | B2* | 4/2020 | Peng | H04N 5/23245 |
| 2005/0014447 | A1* | 1/2005 | Bloch | A63H 30/04 446/427 |
| 2009/0212968 | A1* | 8/2009 | Willett | A63H 30/04 340/4.3 |
| 2012/0313627 | A1 | 12/2012 | Furukawa | |
| 2013/0207828 | A1* | 8/2013 | Tanaka | G08C 19/00 341/176 |
| 2014/0008496 | A1* | 1/2014 | Ye | B64C 13/20 244/190 |
| 2014/0218603 | A1* | 8/2014 | Stone | H04N 5/2252 348/373 |
| 2016/0337562 | A1* | 11/2016 | Kang | G03B 15/006 |
| 2018/0253091 | A1* | 9/2018 | Pfoertzsch | G05D 1/0016 |
| 2020/0079507 | A1* | 3/2020 | Deng | G08C 17/02 |
| 2020/0117279 | A1* | 4/2020 | Hobbs | H04N 5/2251 |

FOREIGN PATENT DOCUMENTS

| | | |
|---|---|---|
| CN | 202289474 U | 7/2012 |
| CN | 202758245 U | 2/2013 |
| CN | 202995990 U | 6/2013 |
| CN | 103476212 A | 12/2013 |
| CN | 203465838 U | 3/2014 |
| CN | 203520611 U | 4/2014 |
| CN | 203556143 U | 4/2014 |
| CN | 203577319 U | 5/2014 |
| CN | 203790584 U | 8/2014 |
| JP | 2003122490 A | 4/2003 |
| JP | 2011100567 A | 5/2011 |
| JP | 2013071696 A | 4/2013 |

\* cited by examiner

DIAL ASSEMBLY, REMOTE CONTROL, AND METHOD FOR CONTROLLING AN UNMANNED AERIAL VEHICLE

CROSS-REFERENCE TO RELATED APPLICATION

This is a continuation application of U.S. patent application Ser. No. 15/471,141, filed on Mar. 28, 2017, which is a continuation application of International Application No. PCT/CN2014/088048, filed on Sep. 30, 2014, the entire contents of which are incorporated herein by reference.

TECHNICAL FIELD

The present disclosure relates to technologies of wireless remote control, and in particular to a dial assembly, a remote control, and a method for controlling an unmanned aerial vehicle.

BACKGROUND

A remote control is widely used for controlling an aircraft, for example, controlling a flight direction of an unmanned aerial vehicle (UAV) that performs a task, and the like. The unmanned aerial vehicle or a high-end aircraft usually may carry some apparatuses. For example, the unmanned aerial vehicle may carry a camera via a gimbal to perform an aerial photography task. The gimbal itself may have a controlling device and a rotating shaft, which can eliminate the vibration of the camera caused while the aerial vehicle is flying and can drive the camera to perform a suitable rotation to adjust a shooting angle of the camera.

Currently, a user on the ground generally transmits a signal to the controlling device of the gimbal by application (APP) software installed on a mobile phone, to control a rotation of the rotating shaft of the gimbal. However, the APP software installed on the mobile phone is inconvenient to operate, has a low precision and an unsmooth control, and couldn't use when the mobile phone is down or when the signal of the relay is interrupted. Further, the user needs to use both the remote control and the mobile phone, which is also inconvenient.

SUMMARY

The present disclosure provides a dial assembly that may transfer a control signal to a gimbal on an unmanned aerial vehicle by a simple mechanical structure and have an auto-return function.

The present disclosure also provides a remote control that may integrate a rolling wheel into a remote control for controlling a whole unmanned aerial vehicle.

The present disclosure further provides a method for controlling an unmanned aerial vehicle.

In one aspect, the present disclosure provides a dial assembly comprising a dial base, a rolling wheel, a dial handle, a reset elastic member, and a sensor. The dial base includes a first rotation channel and a second rotation channel. The rolling wheel is seated on the first rotation channel and rotatable along the first rotation channel. The dial handle is rotatably connected with the dial base and rotatable along the second rotation channel. The dial handle is also connected with the rolling wheel and configured to rotate along with the rolling wheel. The reset elastic member is connected with the dial handle and configured to provide a restoring force to the dial handle. The sensor is connected with the dial handle and configured to obtain a rotation angle of the rolling wheel by sensing a rotation of the dial handle, convert the rotation angle into a control signal, and transmit the control signal.

In some embodiments, the dial base comprises a chassis comprising a first vertical wall provided at an edge of the chassis, and a boss provided on the chassis. The boss comprises a second vertical wall provided at an edge of the boss and a third vertical wall. The first vertical wall and the second vertical wall define the first rotation channel on the chassis, and the second vertical wall and the third vertical wall define the second rotation channel on the boss.

In some embodiments, the dial base comprises an axle hole. The dial handle comprises an axle rod inserted in the axle hole and rotatably connecting the dial handle with the dial base. The first rotation channel and the second rotation channel are each disposed surrounding the axle hole, and are each an arc-shaped channel with the axle hole being a circle center.

In some embodiments, the dial handle further comprises two abutting portions located at two sides of the axle rod, respectively. The reset elastic member is a torsional spring comprising a spring pipe sleeved on the axle rod and two branch legs extending from the spring pipe and abutting against the two abutting portions, respectively.

In some embodiments, the axle rod extends downwards from a bottom of the dial handle. The abutting portions extend downwards from left and right sides of the dial handle, respectively, with a notch formed between the abutting portions. The two branch legs abut against ends of the abutting portions, and further extend beyond the abutting portions through the notch.

In some embodiments, the rolling wheel has an opening and has a circular arc-shaped enclosure formed within the rolling wheel. An assembly hole is provided on an inner wall of the circular arc-shaped enclosure. The dial handle is received in the circular arc-shaped enclosure and comprises a shift lever fixedly assembled in the assembly hole.

In some embodiments, the dial handle comprises stop blocks extending from a back sidewall of the dial handle towards two ends. The dial base comprises stop walls, each of which is spaced apart from one of the stop blocks by a preset distance.

In some embodiments, the dial handle comprises a connecting portion provided at an upper end surface of the dial handle. The sensor comprises a fitting hole receiving the connecting portion. The sensor is configured to obtain a rotation angle of the dial handle by sensing a rotation of the connecting portion.

In some embodiments, the dial assembly further comprises a circuit board comprising a circuit coupled to the sensor and being fixed with the dial base. The sensor is fixed on the circuit board and the connecting portion penetrates through the circuit board to connect with the sensor.

In some embodiments, the sensor comprises a potentiometer or an encoder.

In some embodiments, the reset elastic member is a first reset elastic member. The dial assembly further comprises a second reset elastic member. The first and second reset elastic members are located at two opposite sides of the dial handle, respectively, and two ends of each of the first and second reset elastic members are fixedly connected with the dial handle and the dial base, respectively.

In some embodiments, the reset elastic member comprise at least one of an extension spring or an elastic rubber rope.

In another aspect, the present disclosure provides a remote control comprising a housing, a joystick disposed on the housing and configured to control a direction, and the dial assembly described above. The dial assembly is disposed partially within the housing with the rolling wheel extending out of the housing.

In some embodiments, the joystick comprises a joystick handle and a potentiometer component connected with the joystick handle and configured to sense at least one of upward, downward, leftward, rightward, or rotational motion of the joystick handle, converting the sensed motion into a corresponding control signal, and transmit the control signal.

In another aspect, the present disclosure provides a method for controlling an unmanned aerial vehicle having a gimbal for carrying a camera. The method comprises aiming the remote control described above at the unmanned aerial vehicle and rotating the rolling wheel to adjust an attitude angle of the gimbal, so as to adjust a shooting angle of the camera.

In some embodiments, the attitude angle of the gimbal comprises at least one of a pitch angle, a yaw angle, or a roll angle.

In another aspect, the present disclosure provides a remote control comprising a housing, a rolling wheel disposed on the housing and rotatable with respect to the housing, a sensor configured to sense motion state information of the rolling wheel and output an induced signal correspondingly, and a controlling device disposed within the housing and connected in communication with the sensor. The controlling device is configured to receive the induced signal and output a control signal correspondingly.

In some embodiments, the rolling wheel is rotatable with respect to the housing, and the motion state information comprises rotating state information of the rolling wheel.

In some embodiments, the rotating state information comprises at least one of a rotating angular displacement of the rolling wheel or a rotating acceleration of the rolling wheel.

In some embodiments, the sensor comprises at least one of an angular displacement sensor configured to sense the rotating angular displacement of the rolling wheel or an angular acceleration sensor configured to sense the rotating acceleration of the rolling wheel.

In some embodiments, the rolling wheel is configured to return to an original position after the rolling wheel rotates and is released or stop at a current rotating position after the rolling wheel rotates and is released.

In some embodiments, the rolling wheel is slidable with respect to the housing, and the motion state information comprises sliding state information of the rolling wheel.

In some embodiments, the sliding state information comprises at least one of a sliding displacement of the rolling wheel or a magnitude of a slidably endured force of the rolling wheel.

In some embodiments, the sensor comprises at least one of a displacement sensor configured to sense the sliding displacement of the rolling wheel or a pressure sensor configured to sense the magnitude of an endured force of the rolling wheel.

In some embodiments, the rolling wheel is configured to reset to an original position after the rolling wheel rotates and is released or stop at a current sliding position after the rolling wheel slides and is released.

In some embodiments, the control signal comprises at least one of a signal for controlling an attitude angle of a carrier or a signal for controlling an operating parameter of an imaging device.

In some embodiments, the attitude angle of the carrier comprises at least one of a pitch angle, a translation angle, or a roll angle.

In some embodiments, the operating parameter of the imaging device comprises at least one of an operating mode of the imaging device, a shutter speed of the imaging device, or an aperture size of the imaging device.

In some embodiments, the remote control further comprises a dial base, a dial handle, and a reset elastic member. The dial base comprises a first rotation channel and a second rotation channel. The rolling wheel is seated on the first rotation channel and rotatable along the first rotation channel. The dial handle rotatably is connected with the dial base and rotatable along the second rotation channel. The dial handle is also connected with the rolling wheel and configured to rotate along with the rolling wheel. The reset elastic member is connected with the dial handle and configured to provide a restoring force to the dial handle.

In some embodiments, the dial base comprises a chassis comprising a first vertical wall provided at an edge of the chassis and a boss provided on the chassis. The boss comprises a second vertical wall provided at an edge of the boss and a third vertical wall. The first vertical wall and the second vertical wall define the first rotation channel on the chassis, and the second vertical wall and the third vertical wall define the second rotation channel on the boss.

In some embodiments, the dial base comprises an axle hole. The dial handle comprises an axle rod inserted in the axle hole and rotatably connecting the dial handle with the dial base. The first rotation channel and the second rotation channel are each disposed surrounding the axle hole, and are each an arc-shaped channel with the axle hole being a circle center.

In some embodiments, the dial handle further comprises two abutting portions located at two sides of the axle rod, respectively. The reset elastic member is a torsional spring comprising a spring pipe sleeved on the axle rod and two branch legs extending from the spring pipe and abutting against the two abutting portions, respectively.

In some embodiments, the axle rod extends downwards from a bottom of the dial handle. The abutting portions extend downwards from left and right sides of the dial handle, respectively, with a notch formed between the abutting portions. The two branch legs abut against ends of the abutting portions, and further extend beyond the abutting portions through the notch.

In some embodiments, the rolling wheel has an opening and has a circular arc-shaped enclosure formed within the rolling wheel. An assembly hole is provided on an inner wall of the circular arc-shaped enclosure. The dial handle is received in the circular arc-shaped enclosure and comprises a shift lever fixedly assembled in the assembly hole.

In some embodiments, the dial handle comprises stop blocks extending from a back sidewall of the dial handle towards two ends. The dial base comprises stop walls, each of the stop walls being spaced apart from one of the stop blocks by a preset distance.

In some embodiments, the dial handle comprises a connecting portion provided at an upper end surface of the dial handle. The sensor comprises a fitting hole receiving the connecting portion. The sensor is configured to obtain a rotation angle of the dial handle by sensing a rotation of the connecting portion.

In some embodiments, the remote control further comprises a circuit board comprising a circuit coupled to the sensor and being fixed with the dial base. The sensor is fixed on the circuit board and the connecting portion penetrates through the circuit board to connect with the sensor.

In some embodiments, the reset elastic member is a first reset elastic member. The dial assembly further comprises a second reset elastic member. The first and second reset elastic members are located at two opposite sides of the dial handle, respectively, and two ends of each of the first and second reset elastic members are fixedly connected with the dial handle and the dial base, respectively.

In some embodiments, the reset elastic members comprise at least one of an extension spring or an elastic rubber rope.

The dial assembly according to an embodiment of the present disclosure may achieve a motion and auto-return of a rolling wheel member by a reset elastic member, sense and transmit a control signal by a sensor, avoiding the use of an APP software installed on a mobile phone. A remote control with the dial assembly may integrate the dial assembly and a joystick, thus signals may be transmitted to two receiving terminals, such as an unmanned aerial vehicle and a gimbal. The remote control with the rolling wheel may indicate a motion of a remotely controlled object utilizing a motion of the rolling wheel. The method for controlling the unmanned aerial vehicle may control the gimbal utilizing the remote control of the unmanned aerial vehicle.

REFERENCE NUMBERS OF ELEMENTS

TABLE 1

Figure 1:
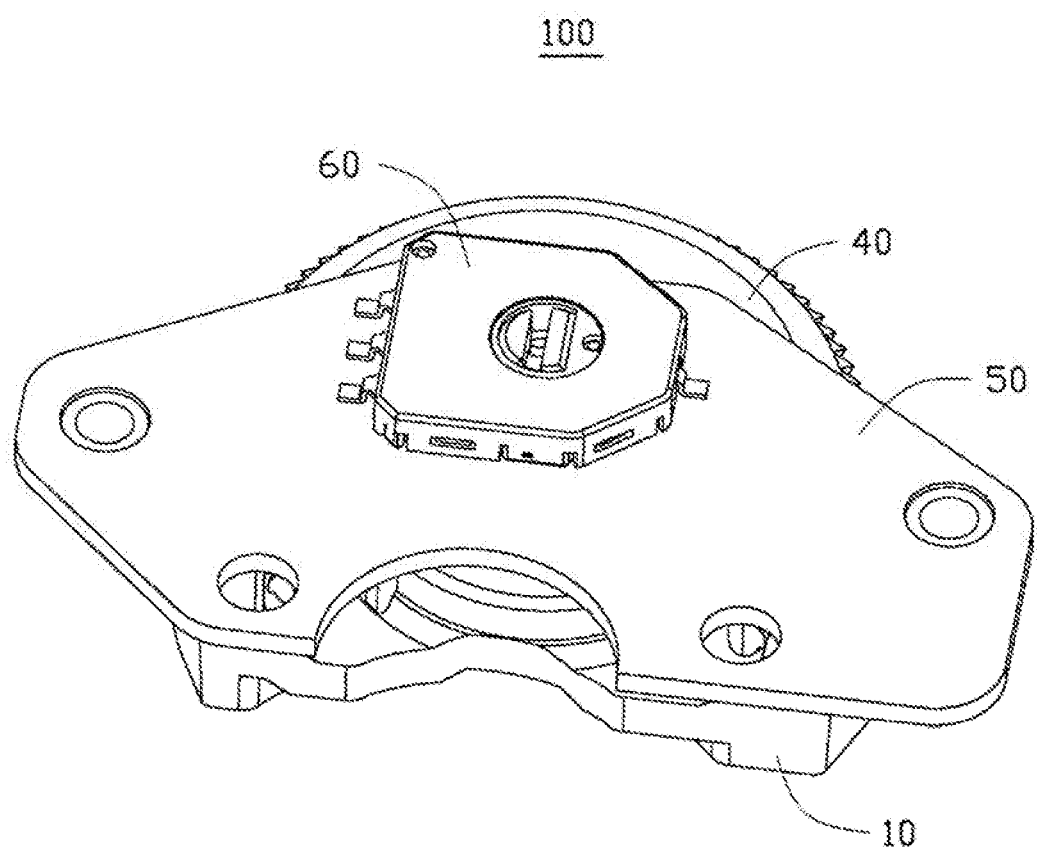
FIG. 1 is a perspective view of a dial assembly provided according to an embodiment of the present disclosure.
Figure 2:
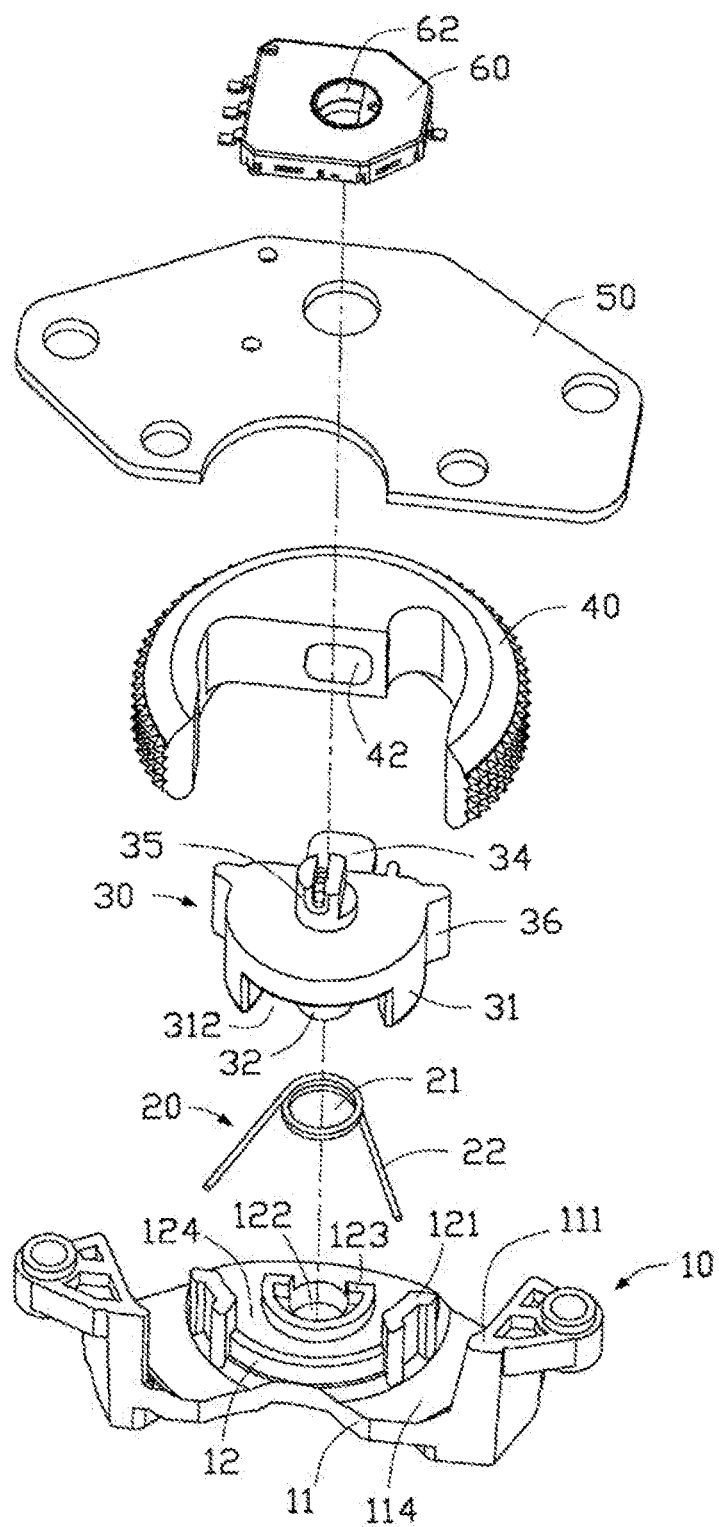
FIG. 2 is an exploded view of the dial assembly of FIG. 1.
Figure 3:
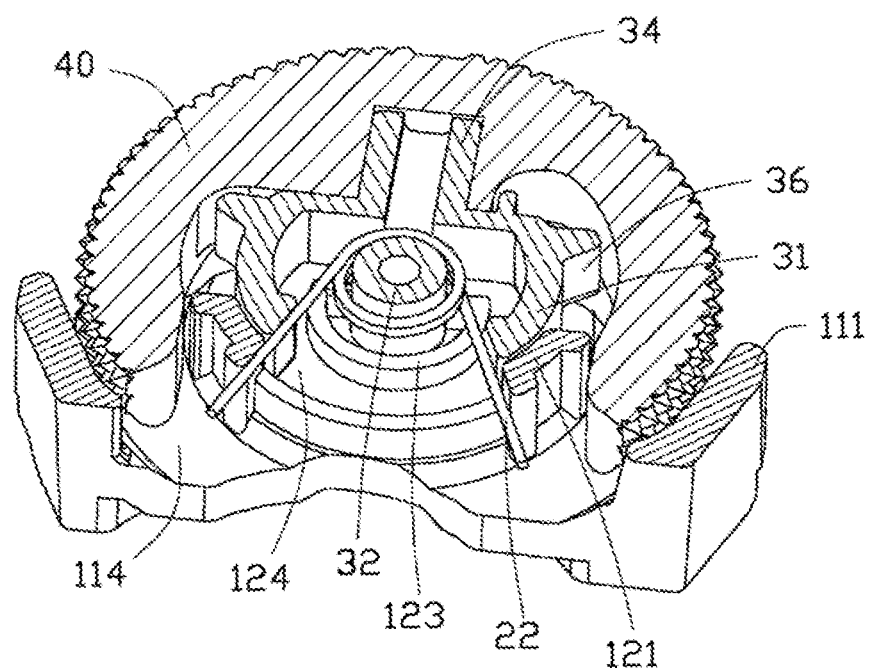
FIG. 3 is a cross sectional view of the assembly of a dial base, a reset elastic member, a dial handle, and a rolling wheel in the dial assembly of FIG. 2.

| | |
|---|---|
| dial assembly | 100 |
| dial base | 10 |
| reset elastic member | 20 |
| dial handle | 30 |
| rolling wheel | 40 |
| circuit board | 50 |
| sensor | 60 |
| chassis | 11 |
| boss | 12 |
| first vertical wall | 111 |
| second vertical wall | 121 |
| axle hole | 122 |
| third vertical wall | 123 |
| first rotation channel | 114 |
| second rotation channel | 124 |
| though hole | 21 |
| branch leg | 22 |
| assembly hole | 42 |
| sidewall | 31 |
| notch | 312 |

TABLE 1-continued

| | |
|---|---|
| axle rod | 32 |
| shift lever | 34 |
| connecting portion | 35 |
| stop block | 36 |
| fitting hole | 62 |
| remote control | 200 |
| housing | 210 |
| rocker | 220 |
| switch | 230 |
| signal lamp | 240 |
| rocker handle | 2202 |

Exemplary embodiments will be described in more detail below in conjunction with the drawings.

DETAILED DESCRIPTION OF THE EMBODIMENTS

The technical solutions of the present disclosure will be described in detail below in combination with the drawings in the embodiments of the present disclosure. It should be noted that embodiments described herein are only some rather than all of the embodiments of the present disclosure. All other embodiments obtained by those having ordinary skills in the art on the basis of the embodiments of the present disclosure without any inventive efforts should fall within the scope of the present disclosure.

A dial assembly provided according to an embodiment of the present disclosure may transfer a control signal to a gimbal on an unmanned aerial vehicle by a simple mechanical structure, and have an auto-return function. According to some embodiments of the present disclosure, a rolling wheel may be integrated into a remote control that controls the whole unmanned aerial vehicle. In some embodiments, instead of the unmanned aerial vehicle and the gimbal, another high-end aircraft and an apparatus with adjusting function carried by an high-end aircraft. Hereinafter, the dial assembly and the remote control will be described by taking the unmanned aerial vehicle and the gimbal as examples.

Referring to FIGS. 1-4, a dial assembly 100 according to an embodiment of the present disclosure may comprise a dial base 10, a reset elastic member 20, a dial handle 30, a rolling wheel 40, a circuit board 50, and a sensor 60 that are assembled in sequence.

The dial base 10 may comprise a chassis 11 and a boss 12 protruding from a center of the chassis 11. An edge of the chassis 11 may be provided with two first vertical walls 111 separated from each other. An edge of the boss 12 may be provided with two second vertical walls 121 separated from each other. An axle hole 122 may be provided at a center of the boss 12. A third vertical wall 123 in an arc shape may be provided around the axle hole 122 at the center of the boss 12.

The two first vertical walls 111 may be disposed opposite to the two second vertical walls 121, respectively. The two first vertical walls 111 and the two second vertical walls 121 may define a first rotation channel 114 on the chassis 11. The two second vertical walls 121 and the third vertical wall 123 may define a second rotation channel 124 on the boss 12. The first rotation channel 114 and the second rotation channel 124 may each be disposed surrounding the axle hole 122, and may each be an arc-shaped channel with the axle hole 122 as a circle center.

In some embodiments, the reset elastic member 20 may be a torsional spring that may have a spring pipe 21 and two branch legs 22 that may extend towards different directions. A metal wire of the torsional spring may have a certain stiffness to repeatedly endure a torsion force. Meanwhile, the two branch legs 22 may have a certain restoring elastic force. A size that the two branch legs 22 open may determine a radian that the torsional spring may twist.

The rolling wheel 40 may have an opening, and may be hollow inside, forming an arc-shaped enclosure. An assembly hole 42 may be provided backward on an inner wall of the circular arc-shaped enclosure. A part of the rolling wheel 40 may be seated on the first rotation channel 114 of the dial base 10, and another part of the rolling wheel 40 may be outside the first rotation channel 114.

Figure 4:
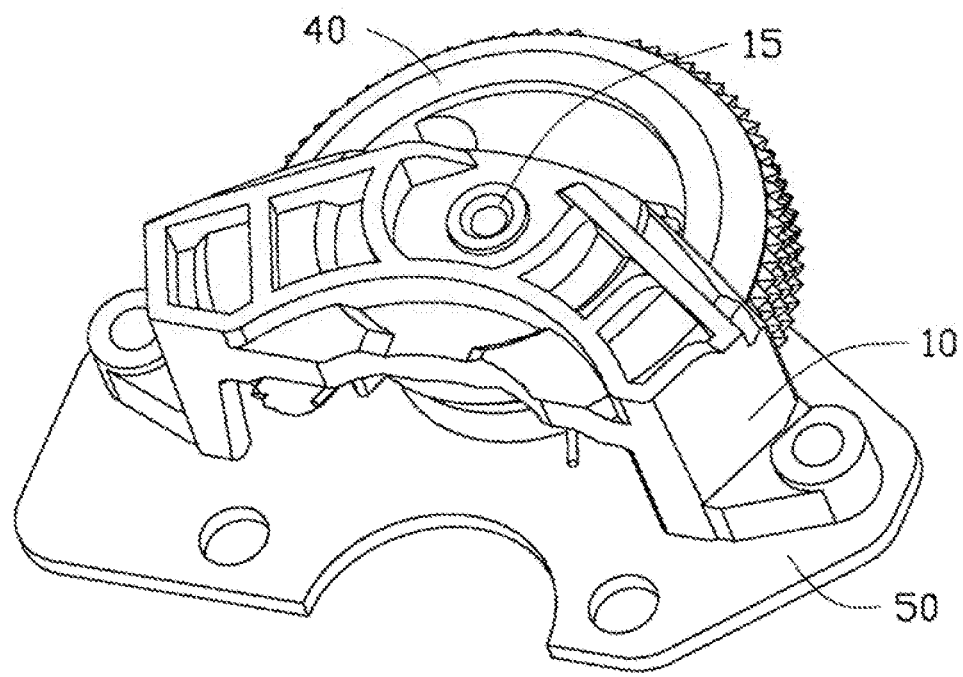
FIG. 4 is substantially the same as FIG. 1 and is a perspective view of the dial assembly of FIG. 1 after being turned by 180°.

Sidewalls 31 may extend downwards at left and right sides of the dial handle 30, respectively. The two sidewalls 31 may be spaced with a notch 312 therebetween. An axle rod 32 may extend downwards from a bottom of the dial handle 30, and a shift lever 34 may extend backwards from a back sidewall of the dial handle 30. The two sidewalls 31 may be seated on the second rotation channel 124 of the dial base 10, and the shift lever 34 of the dial handle 30 may be assembled into the assembly hole 42 of the rolling wheel 40 and fixed by adhesive. The axle rod 32 may penetrate through the spring pipe 21 of the reset elastic member 20, and be rotatably received in the axle hole 122 of the dial base 10. As shown in FIG. 4, the axle rod 32 may be fitted with a screw 15 penetrating upwards from the bottom of the dial base 10, as long as the axle rod 32 may be capable of rotating in the axle hole 122. The reset elastic member 20 may be disposed on the third vertical wall 123, and the branch legs 22 of the reset elastic member 20 may protrude out of the above-described notch 312 and abut against ends of the two sidewalls 31, i.e., the two sidewalls 31 serve as abutting portions. In order that the branch legs 22 of the reset elastic member 20 do not slip from the two sidewalls 31 when the reset elastic member 20 twists, the branch legs 22 may extend beyond the ends of the above-described two second vertical walls 121.

Stop blocks 36 may extend from a back sidewall of the dial handle 30 towards left and right, respectively. Preset distances between the stop blocks 36 and the ends of the second vertical wall 121 may determine a moving range of the dial handle 30, i.e., the maximum angle that the dial handle 30 can rotate with respect to the dial base 10. Therefore, the second vertical walls 121 may function as stop walls.

A connecting portion 35 may extend upwards from an upper end surface of the dial handle 30. The connecting portion 35 may be configured to be connected with and position the circuit board 50 and the sensor 60. The circuit board 50 may provide a circuit needed by the sensor 60. The circuit board 50 may be fixed with the dial base 10, and the sensor 60 may be fixed on the circuit board 50. In some embodiments, the circuit board 50 is not disposed in the dial assembly 100, and may be shared by the dial assembly 100 with another apparatus, such as a remote control (see description below). The sensor 60 may have a fitting hole 62 for the connecting portion 35 to protrude therein, and may obtain rotation angles of the dial handle 30 and the rolling wheel 40 by sensing a rotation of the connecting portion 35. The sensor 60 may be a potentiometer or an encoder.

Specifically, when a user shifts the rolling wheel 40, the rolling wheel 40 may rotate along the first rotation channel 114, and at the same time drive the dial handle 30 to rotate along the second rotation channel 124. The rotation of the dial handle 30 may cause one of the sidewalls 31 of the dial handle 30 to drive one end of the reset elastic member 20 to twist and deform. When the user release the rolling wheel 40, the end of the reset elastic member 20 may rebound automatically due to an elastic force, forcing the dial handle 30 and the rolling wheel 40 to restore to original positions. which is also referred to as auto-returning. The sensor 60 may transmit a sensed rotation angle to a controlling device of the remote control. The controlling device of the remote control may issue a corresponding control command according to the rotation angle. The control command may be sent out by a wireless signal transmission device on the remote control, so that a controlling device of the gimbal may perform a corresponding rotating action after receiving the control command, thereby causing the gimbal to drive the camera to rotate.

In some embodiments, two reset elastic members 20 may be provided, which may be located respectively at two opposite sides of the dial handle 30. Two ends of each of the two reset elastic members 20 may be fixedly connected with the dial handle 30 and the dial base 10, respectively. When the dial handle 30 rotates towards the left side, a deformation amount of the reset elastic member 20 on the left side may be smaller than a deformation amount of the reset elastic member 20 on the right side. When the dial handle 30 rotates towards the right side, the deformation amount of the reset elastic member 20 on the right side may be smaller than the deformation amount of the reset elastic member 20 on the left side. A specific structure of the reset elastic member may be designed according to different requirements. For example, the reset elastic member may be at least one selected from the followings: an extension spring and an elastic rubber rope.

Figure 5:
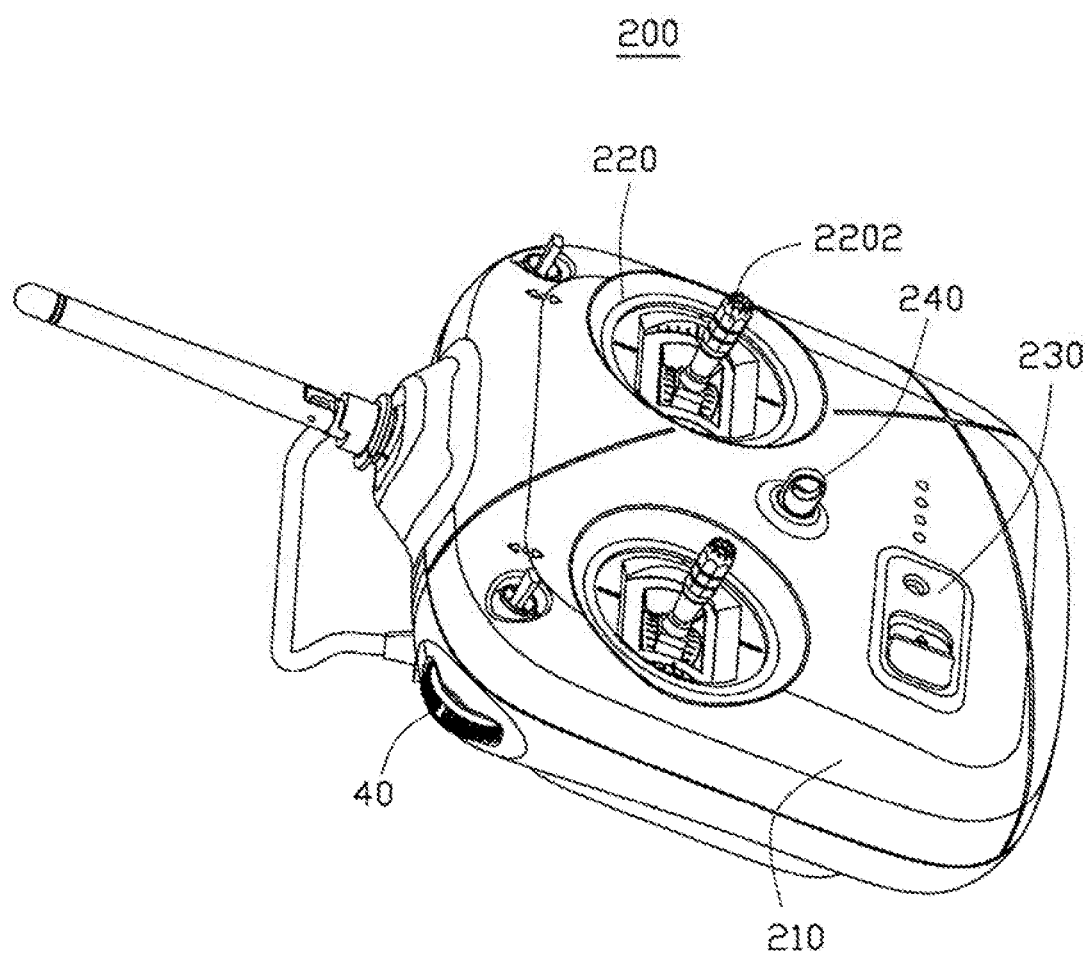
FIG. 5 is a perspective view of a remote control provided according to an embodiment of the present disclosure.
Figure 6:
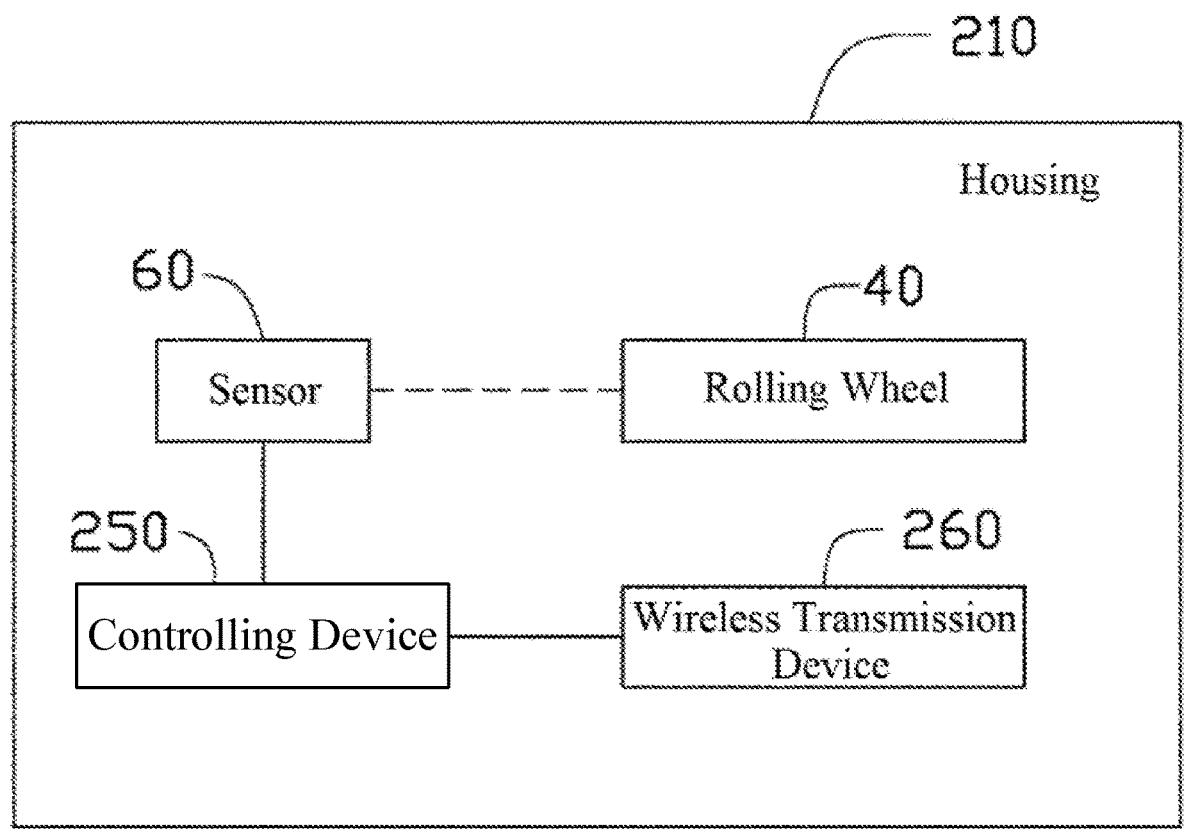
FIG. 6 is a schematic circuit diagram of the remote control as shown in FIG. 5.

FIGS. 5 and 6 show a remote control 200 with a dial assembly according to an embodiment of the present disclosure. The remote control 200 may comprise the dial assembly 100, a housing 210, and a controlling device 250. In some embodiments, the above-described dial assembly 100 may be disposed within the housing 210 of the remote control 200, and the rolling wheel 40 of the dial assembly 100 may be exposed from a side edge of the housing 210.

The housing 210 may serve as a carrier. The rolling wheel 40 may be disposed on the housing 210, and rotatable with respect to the housing 210.

The sensor 60 may be configured to sense motion state information of the rolling wheel 40 and output an induced signal correspondingly. In the illustrated embodiments, the rolling wheel 40 may be rotatable with respect to the housing 210, i.e., the rolling wheel 40 may be used as a rotating button. The motion state information may comprise rotating state information of the rolling wheel 40. For example, the rotating state information may comprise at least one of a rotating angular displacement of the rolling wheel 40 or a rotating acceleration of the rolling wheel 40.

Further, after the rolling wheel 40 rotates and is released, the rolling wheel 40 may automatically return to an original position. In some other embodiments, the rolling wheel 40 may stop at any position after rotating. That is, after the rolling wheel 40 rotates and is released, the rolling wheel 40 may stop at a current rotating position.

Further, the sensor 60 may comprise at least one of an angular displacement sensor configured to sense the rotating angular displacement of the rolling wheel 40 or an angular acceleration sensor configured to sense the rotating acceleration of the rolling wheel 40. In other words, when the rotating state information includes a rotating angular displacement of the rolling wheel 40, the sensor 60 may include the angular displacement sensor. When the rotating state information includes the rotating acceleration of the rolling wheel 40, the sensor 60 may include the angular acceleration sensor.

In some embodiments, the rolling wheel 40 may be slidable with respect to the housing 210, i.e., the rolling wheel 40 may be used as a press button. The motion state information may further comprise sliding state information of the rolling wheel 40. For example, the sliding state information may comprise at least one of a sliding displacement of the rolling wheel 40 or a magnitude of a slidably endured force of the rolling wheel 40.

Further, after the rolling wheel 40 slides and is released, the rolling wheel 40 may automatically reset to the original position. In some other embodiments, the rolling wheel 40 may stop at any position after sliding. That is, after the rolling wheel 40 slides and is released, the rolling wheel 40 may stop at a current sliding position.

Further, the sensor 60 may comprise at least one of a displacement sensor configured to sense the sliding displacement of the rolling wheel 40 or a pressure sensor configured to sense a magnitude of an endured force of the rolling wheel 40. In other words, when the sliding state information includes the sliding displacement of the rolling wheel 40, the sensor 60 may include the displacement sensor. When the sliding state information includes the magnitude of the slidably endured force of the rolling wheel 40, the sensor 60 may include the pressure sensor.

It is noted that, the rolling wheel 40 may both rotate and slide with respect to the housing 210. That is, the rolling wheel 40 may be used as both a rotating button and a press button. The specific working principles may be the same as those described above, and detailed description thereof is omitted.

The controlling device 250 may be disposed within the housing 210 and connected in communication with the sensor 60. The controlling device 250 may be configured to receive the induced signal of the sensor 60, and output a control signal correspondingly.

The control signal may comprise at least one of a signal for controlling an attitude angle of a carrier or a signal for controlling an operating parameter of an imaging device.

In other words, the remote control 200 may be configured to control the carrier. The carrier may be, for example, a gimbal, a frame for fixing a camera, or the like. In these embodiments, the control signal may comprise the signal for controlling the attitude angle of the carrier. The attitude angle of the carrier comprises at least one of a pitch angle, a yaw angle, or a roll angle.

The remote control 200 may also be configured to control an imaging device. The imaging device may be, for example, a camera. In these embodiments, the control signal may comprise the signal for controlling the operating parameter of the imaging device. The operating parameter of the imaging device may comprise at least one of an operating mode of the imaging device, a shutter speed of the imaging device, or an aperture size of the imaging device.

Further, the remote control 200 may also comprise a wireless transmission device 260 configured to send the control signal wirelessly and receive an external wireless signal.

Specific structures of other elements of the dial assembly 100 may be described as the above-described embodiments, and the detailed description thereof is omitted.

The remote control 200 may further comprise a joystick 220, a switch 230, a signal lamp 240, and the like. In some embodiments, two joysticks 220 may be provided, with each joystick 220 comprising a joystick handle 2202 and a potentiometer component (not shown) connected with the joystick handle 2202. The potentiometer component may be configured to sense upward, downward, leftward, rightward, and rotational motions of the joystick handle 2202, convert the motions into corresponding control signals, and transmit the control signals.

It is understood that, when the remote control 200 is provided with a plurality of dial assemblies consistent with the present disclosure in different directions, rotations of the carrier in a plurality of directions or a plurality of operating parameters of the imaging device may be adjusted.

Figure 7:
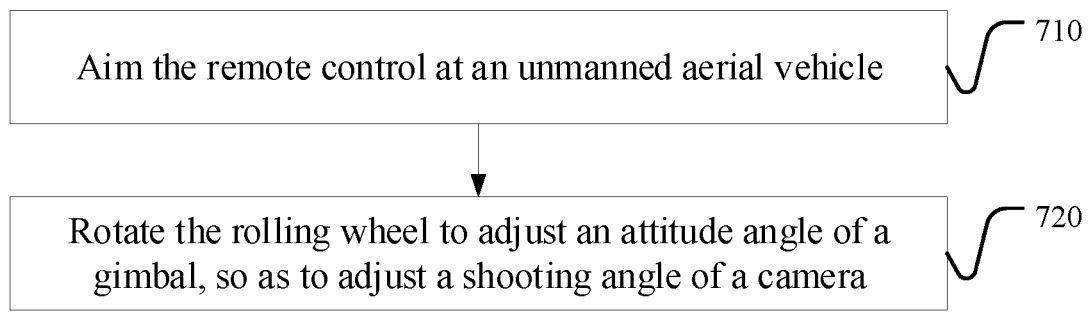
FIG. 7 is a flow chart of a method for controlling an unmanned aerial vehicle provided according to an embodiment of the present disclosure.

FIG. 7 shows a method for controlling an unmanned aerial vehicle according to an embodiment of the present disclosure. As shown in FIG. 7, the above-described remote control is aimed at the unmanned aerial vehicle (710), and the rolling wheel 40 is rotated to adjust an attitude angle of a gimbal, so as to adjust a shooting angle of a camera (720).

The attitude angle of the gimbal may comprise at least one of a pitch angle, a yaw angle, or a roll angle.

The dial assembly according to the present disclosure may achieve a motion and auto-return of a rolling wheel member by a reset elastic member, and sense and transmit a control signal by a sensor. Thus, the use of an APP software installed on a mobile phone is avoided. The dial assembly and a rocker may be integrated in a remote control, and thus signals can be transmitted to two receiving terminals, e.g., an unmanned aerial vehicle and a gimbal. The remote control with a rolling wheel may indicate a motion of a remotely controlled object utilizing a motion of the rolling wheel. The method for controlling the unmanned aerial vehicle may control the gimbal utilizing the remote control of the unmanned aerial vehicle.

The foregoing disclosure is merely illustrative of the embodiments of the disclosure, and is not intended to limit the scope of the disclosure. Any equivalent structural or flow variations made on the basis of the description and the drawings of the disclosure, and their direct or indirect applications to other relevant technical fields, shall fall into the scope of the disclosure.

What is claimed is:

1. A dial assembly, comprising:
   a rolling wheel;
   a dial handle connected with the rolling wheel and configured to rotate along with the rolling wheel; and
   a sensor connected with the dial handle and configured to:
      obtain a rotation angle of the rolling wheel by sensing a rotation of the dial handle,
      convert the rotation angle into a control signal, wherein the control signal includes one of: a signal for controlling an attitude angle of a carrier or a signal for controlling an operating parameter of an imaging device; and
      transmit the control signal.

2. The dial assembly of claim 1, further comprising:
   a dial base including a first rotation channel and a second rotation channel,
   wherein the rolling wheel is seated on the first rotation channel and rotatable along the first rotation channel; the dial handle rotatably rotates along the second rotation channel, the dial handle being connected with the rolling wheel and configured to rotate along with the rolling wheel, and the dial base further comprises:
   a chassis comprising a first vertical wall provided at an edge of the chassis; and
   a boss provided on the chassis, the boss comprising a second vertical wall provided at an edge of the boss, and a third vertical wall,
   wherein the first vertical wall and the second vertical wall define the first rotation channel on the chassis, and the second vertical wall and the third vertical wall define the second rotation channel on the boss.

3. The dial assembly of claim 2, wherein:
the dial base comprises an axle hole,
the dial handle comprises an axle rod inserted in the axle hole and rotatably connecting the dial handle with the dial base, and
the first rotation channel and the second rotation channel are each disposed surrounding the axle hole, and are each an arc-shaped channel with the axle hole being a circle center.

4. The dial assembly of claim 3, wherein:
the dial handle further comprises two abutting portions located at two sides of the axle rod, respectively.

5. The dial assembly of claim 4, wherein:
the axle rod extends downwards from a bottom of the dial handle,
the abutting portions extend downwards from left and right sides of the dial handle, respectively, with a notch formed between the abutting portions, and
two branch legs abut against ends of the abutting portions, and further extend beyond the abutting portions through the notch.

6. The dial assembly of claim 2, wherein:
the dial handle comprises stop blocks extending from a back sidewall of the dial handle towards two ends, and
the dial base comprises stop walls, each of the stop walls being spaced apart from one of the stop blocks by a preset distance.

7. The dial assembly of claim 6, further comprising:
a circuit board comprising a circuit coupled to the sensor and being fixed with the dial base,
wherein the sensor is fixed on the circuit board and the connecting portion penetrates through the circuit board to connect with the sensor.

8. The dial assembly of claim 2, further comprising:
a reset torsion spring connected with the dial handle, and configured to provide a restoring force to the dial handle, wherein the reset torsion spring includes a first reset torsion spring and a second reset torsion spring, the first and second reset torsion springs being located at two opposite sides of the dial handle, respectively, and two ends of each of the first and second reset torsion springs being fixedly connected with the dial handle and the dial base, respectively.

9. The dial assembly of claim 8, wherein the reset torsion spring comprises at least one of an extension spring or an elastic rubber rope.

10. The dial assembly of claim 1, wherein:
the rolling wheel has an opening and has a circular arc-shaped enclosure formed within the rolling wheel, an assembly hole being provided on an inner wall of the circular arc-shaped enclosure, and
the dial handle is received in the circular arc-shaped enclosure and comprises a shift lever fixedly assembled in the assembly hole.

11. The dial assembly of claim 1, wherein:
the dial handle comprises a connecting portion provided at an upper end surface of the dial handle, and
the sensor comprises a fitting hole receiving the connecting portion, the sensor being configured to obtain a rotation angle of the dial handle by sensing a rotation of the connecting portion.

12. The dial assembly of claim 11, wherein the sensor comprises a potentiometer or an encoder.

13. A remote control comprising:
a housing; and
a dial assembly that is disposed partially within the housing, the dial assembly comprising:
a rolling wheel;
a dial handle connected with the rolling wheel and configured to rotate along with the rolling wheel; and
a sensor connected with the dial handle and configured to:
obtain a rotation angle of the rolling wheel by sensing a rotation of the dial handle,
convert the rotation angle into a control signal, wherein the control signal includes one of: a signal for controlling an attitude angle of a carrier or a signal for controlling an operating parameter of an imaging device; and
transmit the control signal.

14. The remote control of claim 13, the dial assembly further comprising:
a dial base including a first rotation channel and a second rotation channel,
wherein the rolling wheel is seated on the first rotation channel and rotatable along the first rotation channel;
the dial handle rotatably rotates along the second rotation channel, the dial handle being connected with the rolling wheel and configured to rotate along with the rolling wheel, and the dial base further comprises:
a chassis comprising a first vertical wall provided at an edge of the chassis; and
a boss provided on the chassis, the boss comprising a second vertical wall provided at an edge of the boss, and a third vertical wall,
wherein the first vertical wall and the second vertical wall define the first rotation channel on the chassis, and the second vertical wall and the third vertical wall define the second rotation channel on the boss.

15. The remote control of claim 14, wherein the dial base comprises an axle hole, the dial handle comprises an axle rod inserted in the axle hole and rotatably connecting the dial handle with the dial base, and the first rotation channel and the second rotation channel are each disposed surrounding the axle hole, and are each an arc-shaped channel with the axle hole being a circle center.

16. The remote control of claim 15, wherein:
the dial handle further comprises two abutting portions located at two sides of the axle rod, respectively, and
the dial assembly further comprises a torsional spring comprising:
a spring pipe sleeved on the axle rod; and
two branch legs extending from the spring pipe and abutting against the two abutting portions, respectively.

17. The remote control of claim 16, wherein the rolling wheel has an opening and has a circular arc-shaped enclosure formed within the rolling wheel, an assembly hole being provided on an inner wall of the circular arc-shaped enclosure, and the dial handle is received in the circular arc-shaped enclosure and comprises a shift lever fixedly assembled in the assembly hole.

18. The remote control of claim 16, further comprising a joystick disposed on the housing and configured to control a direction, wherein the joystick comprises:
a joystick handle; and
a potentiometer component connected with the joystick handle and configured to:

sense at least one of upward, downward, leftward, rightward, or rotational motion of the joystick handle, converting the sensed motion into a corresponding control signal, and transmit the corresponding control signal.

19. A system for controlling an unmanned aerial vehicle having a gimbal for carrying a camera, comprising:
 a remote control configured to control the unmanned aerial vehicle, the remote control including a housing and a dial assembly, the dial assembly including:
  a rolling wheel;
  a dial handle connected with the rolling wheel and configured to rotate along with the rolling wheel; and
  a sensor connected with the dial handle and configured to obtain a rotation angle of the rolling wheel by sensing a rotation of the dial handle, to convert the rotation angle into a control signal wherein the control signal includes one of: a signal for controlling an attitude angle of a carrier or a signal for controlling an operating parameter of an imaging device, and to transmit the control signal.

20. The system for controlling the unmanned aerial vehicle of claim 19, wherein the attitude angle of the gimbal comprises at least one of a pitch angle, a yaw angle, or a roll angle.

* * * * *